May 17, 1949.  E. G. CHILTON  2,470,338
PROBE PRESSURE GUN
Filed Nov. 29, 1947

Inventor: Ernest G. Chilton
By his Attorney

Patented May 17, 1949

2,470,338

UNITED STATES PATENT OFFICE 2,470,338

PROBE PRESSURE GUN

Ernest G. Chilton, Berkeley, Calif., assignor to Shell Development Company, San Francisco, Calif., a corporation of Delaware Application November 29, 1947, Serial No. 788,911

2 Claims. (Cl. 175—183)

This invention relates to a method and apparatus for inserting a probe into a conduit or tube and pertains more particularly to a pneumatic or fluid-pressure gun for propelling through a tube, a probe having a flexible cable attached thereto.

Inspection and testing of tubular elements for flaws or weaknesses, such as pits, corrosion, wear, etc., may be accomplished by means of suitable flaw detectors working on the magnetic principle. One type of flaw detector utilizes a plug-like electrical probe, slightly smaller than the inside diameter of the conduit being tested, which is drawn through the conduit by an electrical cable attached to the probe. The cable, in turn, may be connected to a suitable electrical circuit and recording device whereby inspection data of the conduit may be measured and recorded. An apparatus incorporating these elements is described in copending applications Serial No. 554,826, filed September 19, 1944, now abandoned, and Serial No. 692,485, filed August 23, 1946.

Prior to being drawn or pulled through the conduit or tube while actually running the test, the above-mentioned electrical probe, and its attached cable or electrical conduit, must be inserted into one end of the tube and moved therethrough to the other end of the tube. In testing a vertical conduit or tube having open ends the probe, and cable attached thereto, may be fed into the upper end of the tube, gravity causing it to move to the lower end. However, most of the tubes normally tested are commonly used in a horizontal position. Thus, in equipment such as tubular boilers, condensers, heat exchangers, etc., large numbers of tubes are held together in bundles by means of headers, tube sheets, etc., which bundles are usually encased in a surrounding shell.

In order to pass a probe and its attached cable through a horizontal tube in a tube bundle, the probe and cable may be inserted into one end of the tube and slowly pushed through by manually forcing the cable into the tube. This method of inserting a probe has been found to be very slow and unsatisfactory, as the flexible cable, by which the probe is pushed, has a tendency to twist and kink in the tube. In another method, the probe and its attached cable may be drawn through the tube by first inserting into the tube a rod or wire whose end may be temporarily connected to the probe, whereby said probe may be drawn through the tube when the rod is withdrawn. This method is also quite inadequate, as both ends of the tube bundle must be open, or the tube bundle removed from its surrounding shell, so that the rod may be inserted from the opposite end. Since tubes having a length of twenty feet are common, the rod or wire inserted through such a tube has proved cumbersome to handle. This method is also objectionable as it requires the services of at least one operator at either end of the tube bundle if the tubes are to be tested with any degree of rapidity. As there are generally hundreds of tubes in a tube bundle, time is of the essence in the insertion of the probe in order to maintain an adequate cost figure for the testing operation. While considerable development has taken place on methods and apparatus such as automatic or synchronized pullers for withdrawing a probe from a tube while running the test, little has been accomplished with regard to methods and apparatus for inserting the test probe into a tube prior to the test. Since tubes of various diameters are encountered in tests, it is desirable to have an apparatus that could be used interchangeably in all of them.

It is therefore a primary object of this invention to provide a device for inserting a test probe into the open end of a conduit and rapidly moving or transferring said probe to the opposite end of the conduit.

It is also an object of this invention to provide for this purpose an apparatus for directing fluid pressure against the probe and subjecting said probe to a fluid pressure build-up whereby said probe is projected through the tube to be tested.

A further object of the present invention is to provide a probe-projecting device whereby a probe having a cable attached thereto may be quickly and easily projected through a tube by fluid pressure.

Still another object of the present invention is to provide a pressure gun for projecting a probe through a tube and for removing loose scale and debris ahead of the probe.

A still further object of the present invention is to provide a pressure gun adapted to be used with tubes of different diameters for projecting a probe therethrough.

Other objects and advantages of the invention will become apparent from the following detailed description taken with reference to the drawing, wherein.

Briefly, the pressure gun of the present invention adapted to project into the open end of a tube a probe having a flexible cable attached thereto, comprises a barrel member adapted to substantially close the open end of the tube when positioned at one end thereof, handle means attached to said barrel member, fluid conduit means through said barrel member and said handle means, valve means in said fluid conduit, means for controlling fluid flow therethrough, flexible conduit means attached to said handle means and in communication with the conduit means therethrough for supplying fluid under pressure thereto, and cable guide means in said barrel member whereby the cable attached to the probe may enter said tube through said barrel member.

Figure 1:
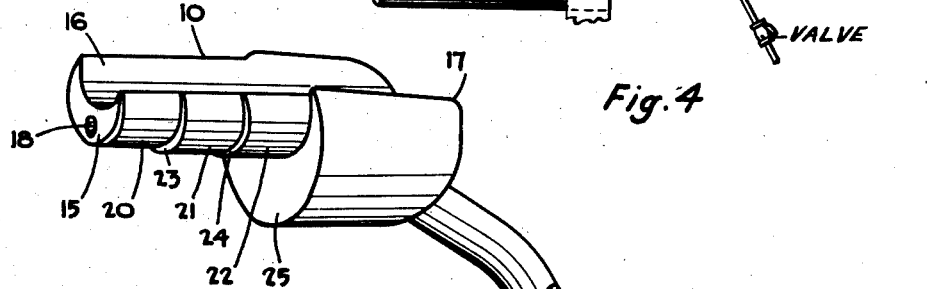
Figure 1 is a view, in isometric projection of a particular embodiment of a probe-projecting pressure gun according to the present invention.

Referring to Figure 1 of the drawing, the probe-projecting pressure gun of the present invention is shown having a barrel member 10 that may be fixedly or removably attached to any suitable handle means 11. The handle may be in the form of a pipe or tubing having a central bore or it may be integrally formed with said barrel member 10 and have fluid conduit means 12 therethrough. The flow of fluid through the conduit may be controlled by having mounted therein any suitable valve means such as a normally closed fluid valve 13 having lever means such as a spring-loaded handle 14 by which the valve may be opened and closed. Fluid pressure may be supplied to said conduit 12 in said handle 11 from any suitable source through a flexible conduit 19.

The barrel member 10 may be of any shape and preferably has a nozzle end 15 of a suitable size to permit it to be partially inserted into the open end of a tube through which it is desired to project a probe and the flexible cable attached thereto. In order that the barrel member 10 may be adapted for operation with tubes of different diameters, it is made or machined so as to taper toward the nozzle end 15, or so as to form a stepwise series of sections or portions of decreasing diameters as shown in Figure 1. With the barrel member 10 having the above-described step-wise construction it can be readily used with three tubes of different diameters, for example, five-eighths, three-quarters and one inch tubing or with three different gauges of the same size of tubing.

Formed or drilled in the barrel member 10 is a cable guide or conduit means 16 which runs longitudinally along said barrel and is open at both the nozzle 15 and the back end 17 thereof. The cable guide means is formed preferably as a concave or semi-cylindrical open trough or channel co-longitudinal with the axis of the barrel 10, as shown in Figure 1. If portions of the barrel 10 are machined so as to have varying diameters that fit into tubes of varying sizes or gauges, it is preferred that these portions 20, 21 and 22 be machined eccentrically so that one point of the surface, preferably the top of each portion lies in the same plane. Thus, a cable trough or channel 16 cut along the top of the eccentric portions of the barrel 10 may be the same depth throughout its length and furnish a substantially constant clearance around a cable positioned in said channel 16. Eccentric machining of these portions 20, 21 and 22 forms crescent-shaped shoulders 23, 24 and 25 adjacent said portions. These shoulders aid in sealing one end of the tube when positioned against the end thereof. Instead of using a tapered barrel 10, a set of barrels of varying sizes may be used with a pressure gun having a detachable handle.

The barrel 10 is also equipped with longitudinal pressure fluid conduit means such as a bore 18, or a plurality of such bores, formed or drilled therein, preferably adjacent, but not in communication with, the cable guide conduit 16. This fluid conduit or bore 18 is open at the nozzle end 15 of the barrel 10 and is in communication at its other end with the fluid conduit means 12 through the handle whereby a fluid pressure may be supplied through said handle conduit 12 to said barrel conduit 18 and exhausted at the barrel nozzle 15. The nozzle end of the barrel fluid conduit is preferably the most constricted point in the fluid pressure line so as to provide a jetting action at this point.

Figure 2:
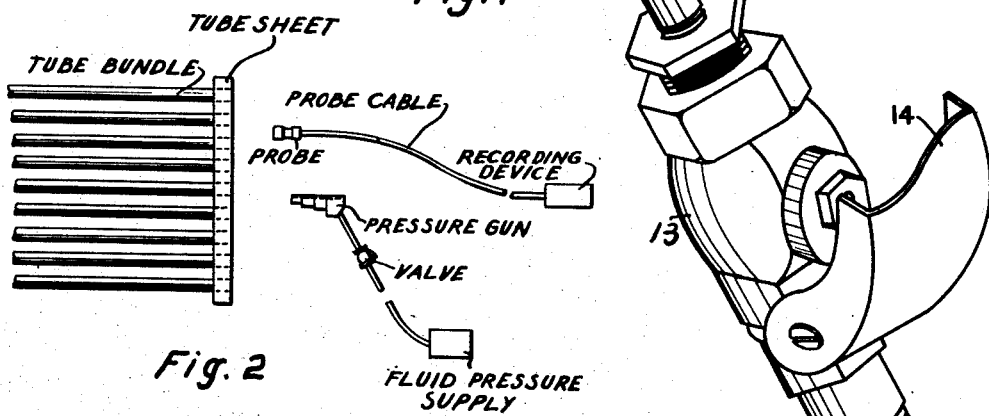
Figure 2 is a diagrammatic view of a tube bundle and tube testing equipment according to the present invention.
Figure 3:
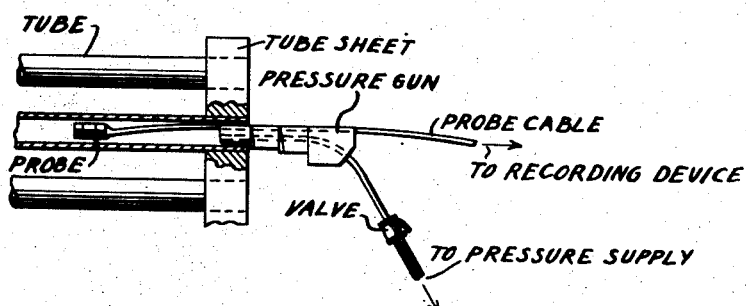

In operation, as shown in Figures 2 and 3, the probe and its attached cable may be inserted by hand a few inches into the tube to be tested. The nozzle end of the barrel of the pressure gun is then inserted into the end of the same tube while the electrical cable extending therefrom is positioned in the cable guide conduit or trough in the top of the barrel. If the probe is being inserted in a small tube, only one section of the barrel, e. g. section 20, is positioned in the tube with its adjacent shoulder 23 contacting the end of the tube thus substantially sealing the end of the tube to prevent the escape of pressure fluid. The inserted part of the barrel 20 also centers and guides the cable being projected into the tube. Fluid pressure from any suitable source, such as a pump, compressor or storage cylinder, may be then applied to the probe in the tube by opening the valve in the fluid pressure conduit. The fluid pressure, on being discharged from the nozzle of the gun, acts against the rear face of the probe to propel it through the tube. Although the operation is described with regard to a probe that is larger than the cable this method of probe projecting may be utilized with equal success with a probe of any shape or size even if it is as small as the cable itself. The speed at which the probe is projected may be controlled by the amount of fluid pressure supplied or by the rate at which the attached cable is allowed to enter the tube. The latter may be controlled by hand or by any suitable mechanical means. The distance to which the probe is projected into a tube may be controlled by the amount of cable permitted to be drawn into said tube.

Since the diameter of the probe is slightly smaller than the inside diameter of the tube being tested, a small amount of the pressure fluid necessarily escapes around said probe. This escaping fluid is advantageous in that it tends to remove loose scale or debris which normally piles up in front of the probe as it is pushed through the tube. Although compressed air is the most common pressure fluid used for the above-described operation, any suitable pressure fluid may be used.

Figure 4:
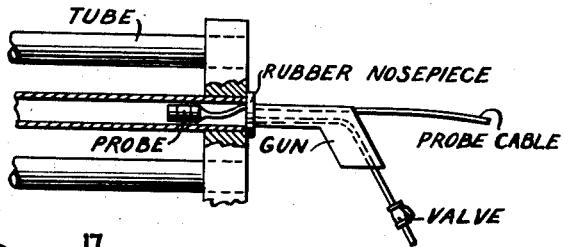
Figures 3 and 4 are diagrammatic views partially in cross section of the two embodiments of the pressure gun of the present invention when positioned in one end of a tube.

While the method of the present invention has been described with regard to substantially sealing a tube to be tested by inserting the nozzle 15 of a pressure gun therein, the tube may be also substantially sealed by a similar gun having a nozzle large enough to extend over the edges of the tube end when positioned or held against it, said nozzle preferably being covered with a resilient material such as rubber to furnish a better seal between said nozzle and said tube end as shown in Figure 4.

I claim as my invention:

1. For use in combination with a probe element adapted to be inserted into a tube at the end of a cable, a fluid pressure device for forcing said element and cable through said tube, said device comprising an elongated barrel body having one end adapted to be inserted into the tube behind said probe element, said barrel body being formed of a plurality of cylindrical elements having diameters increasing in a step-wise fashion from said insertable end of the barrel body, said elements being arranged longitudinally and eccentrically of each other, so as to be tangent to a single plane parallel to the axis of said cylindrical elements, whereby a series of crescent-shaped shoulders is formed between said cylindrical elements, each of said shoulders being adapted substantially to close the orifice of a pipe when the adjacent cylindrical element of the smaller diameter has been inserted into said pipe, said barrel body having a longitudinal open groove cut therein from one end to the other symmetrically to said plane of tangency, said groove being adapted to receive and to guide the cable attached to said probe element, said barrel body having a bore formed therein co-longitudinally with said groove, said bore being open at the end of the barrel body insertable into the tube, pressure fluid conduit means in communication with said bore, and valve means for controlling the delivery of the pressure fluid from said conduit means through the open end of said bore to the space within the tube behind said probe element, whereby said probe element is propelled in said tube together with the attached cable entering said tube through said groove.

2. For use in combination with a probe element adapted to be inserted into a tube at the end of a cable, a fluid pressure device for forcing said element and cable through said tube, said device comprising an elongated barrel body having one end adapted to be inserted into the tube behind said probe element, said barrel body being formed of a plurality of cylindrical elements having diameters increasing in a step-wise fashion from said insertable end of the barrel body, said elements being arranged longitudinally to each other, whereby a series of sealing shoulders is formed between said cylindrical elements substantially at right angles thereto, each of said shoulders being adapted substantially to close the orifice of a pipe when the adjacent cylindrical element of the smaller diameter has been inserted into said pipe, said barrel body having a longitudinal open groove cut therein from one end to the other, said groove being adapted to receive and to guide the cable attached to said probe element, said barrel body having a bore formed therein co-longitudinally with said groove, said bore being open at the end of the barrel body insertable into the tube, pressure fluid conduit means in communication with said bore, and valve means for controlling the delivery of the pressure fluid from said conduit means through the open end of said bore to the space within the tube behind said probe element, whereby said probe element is propelled in said tube together with the attached cable entering said tube through said groove.

ERNEST G. CHILTON.

REFERENCES CITED

The following references are of record in the file of this patent:

UNITED STATES PATENTS

| Number | Name | Date |
|---|---|---|
| 1,851,435 | Jessup | Mar. 29, 1932 |

OTHER REFERENCES

"Electrical World," vol. 91, No. 25, page 1334.